United States Patent [19]

Letchworth

[11] 3,712,269

[45] Jan. 23, 1973

[54] CULTIVATION OF LARGE SIZED LARVAE

[75] Inventor: Peter E. Letchworth, Palo Alto, Calif.

[73] Assignee: Stauffer Chemical Company, New York, N.Y.

[22] Filed: Oct. 1, 1971

[21] Appl. No.: 185,852

[52] U.S. Cl...................119/51, 99/2 R, 99/3, 119/1
[51] Int. Cl....................A01k 67/00, A23k 1/00
[58] Field of Search...........119/51, 1; 99/2 R, 2 G, 3

[56] References Cited

UNITED STATES PATENTS

| | | | |
|---|---|---|---|
| 2,643,189 | 6/1953 | Gould | 99/3 |
| 3,115,864 | 12/1963 | Wagner | 119/1 |
| 3,583,871 | 6/1971 | Niimura et al. | 119/51 R |
| 3,632,752 | 1/1972 | Ware | 99/2 G X |

*Primary Examiner*—Louis G. Mancene
*Assistant Examiner*—James W. Czerwonky
*Attorney*—Daniel C. Block et al.

[57] ABSTRACT

A method of cultivating abnormally large sized larvae for use as food for small animals and fish bait is described herein. The process involves the addition of a particular type of compound to the normal nutrient environment of the larvae, the amount being between about 0.0001 and 0.01 percent by weight of the nutrient environment. The particular compounds have the following generic formula:

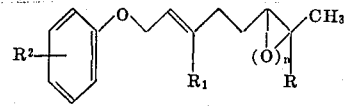

in which R and $R_1$ are independently methyl or ethyl; $n$ is an integer 0 or 1; $R_2$ is hydrogen, lower alkyl, lower alkynyl, lower alkoxy, halogen, nitro, lower alkyl thio, or certain heterocyclic radicals.

2 Claims, No Drawings

CULTIVATION OF LARGE SIZED LARVAE

BACKGROUND OF THE INVENTION

In the art of cultivating Tenebrio molitor larvae, commonly known as yellow mealworms, it is the practice to place the freshly hatched larvae in a nutrient environment. The most commonly used nutrient is bran or ground wheat hulls. While in this nutrient environment, the larvae continuously grow and molt to a larger size. At the end of about 4 months, when the larvae are about 1 inch long, they molt to pupae, and about 1 week thereafter, the pupae molt to adult beetles.

When growing the larvae as food for birds, fish, turtles, monkeys, frogs, rats or as fish bait, the larvae grower must ship the larvae to the ultimate user at some time prior to the molting thereof into pupae, since the pupae are not desirable as pet food or fish bait. The precise time for shipment to the user will vary depending on the environmental conditions, such as temperature and relative humidity. Normally, sufficient amount of time should be provided for normal shelf-life, since all the larvae in a single shipment can not be used simultaneously. Since a premium price is obtained for over-sized larvae, much time and research has been spent on methods of growing abnormally sized larvae. One approach has been to add special nutrients to the nutrient environment, such as animal and/or vegetable components and the like. One such additive is any one or a mixture of the various brands of dog food. These approaches, however, have not been notably successful.

DESCRIPTION OF THE INVENTION

It has been discovered that large Tenebrio molitor larvae can be grown in a normal nutrient habitat by adding thereto an effective amount of a compound represented by the following formula:

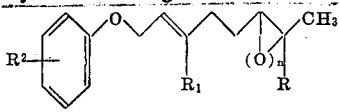

in which R and $R_1$ are independently methyl or ethyl; $n$ is an integer 0 or 1; $R_2$ is hydrogen, lower alkyl, lower alkynyl, lower alkoxy, halogen, nitro, lower alkyl thio, or certain heterocyclic radicals. R can be in the cis or trans position.

This class of compounds acts in a different manner on the larvae by exerting a disrupting influence on the normal development of the larvae. The compounds impede the pupation of the larvae and result in the elongation of the normal molting period. That is to say, the change of the larvae into pupae is prevented. By employing this class of compounds the larvae are allowed to grow three to four times the normal size. This class of compounds is described and claimed in Belgian Pat. No. 734,904, published Dec. 22, 1969, which is based on a U.S. Pat. application Ser. No. 75,667, filed June 20, 1969, now abandoned, the subject-matter of which is incorporated herein by reference. Thus, the manner in which these compounds are made are described in the prior art as noted above, but their use as described herein has not been described or published.

In normal use, the compounds of this invention are applied to the nutrient habitat of the larvae in an amount ranging between about 0.0001 to about 0.01 percent by weight of the bran. The compounds are applied to the habitat in the form of dusts, spray emulsions and the like. It is essential that the compounds applied to the habitat thereof be uniformly distributed throughout the nutrient habitat of the larvae.

In order to illustrate the merits of the present invention, several tests were conducted on Tenebrio molitor larvae treated with a compound having the following formula:

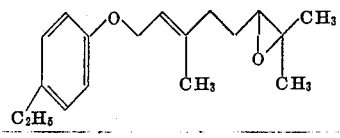

In this procedure, the compound was added to 250 g. of bran directly as a dry formulation, in 1 ml. of water as an emulsifiable concentrate, and in 1 ml. of acetone as the technical. Following the addition of the chemical, the bran was tumbled in a container for two hours. Finally, 30 to 50 larvae were added to the bran. The larvae were allowed to develop at 75° F. and 45 percent relative humidity with no moisture source provided in the bran. At approximately the time of pupation, the untreated control larvae were gathered up and their average weight was recorded in milligrams. The larvae in the other six runs with the added chemical compound were allowed to grow and molt until they were considerably larger than could be expected under normal conditions. The following table summarized data taken 4, 6 and 7 weeks subsequent to the initiation of the tests.

TABLE I

EFFECT OF ADDITIVE ON SIZE OF TENEBRIO MOLITOR LARVAE

| Sample | Concentration ppm | Time Weeks | Average Larval Weight mg | % Weight Increase |
|---|---|---|---|---|
| Pre-pupal larvae | — | — | 163 | — |
| 5% Dust | 100 | 4 | 172 | 5.5 |
| 5% Granular | 100 | 4 | 203 | 24.5 |
| Microencapsulated | 100 | 4 | 179 | 9.8 |
| Technical | 100 | 4 | 197 | 21.0 |
| Technical | 50 | 6 | 244 | 100.0 |
| Technical | 10 | 7 | 385 | 135.0 |

The run made that was tested at 7 weeks was allowed to stand to determine the amount of time required for the larvae to pupate. At the end of 4-½ months the larvae had still not pupated.

What is claimed is:

1. In the process of cultivating Tenebrio molitor, wherein the hatched larvae are grown in a nutrient environment and harvested at some time prior to pupation, the improvement comprising adding to the nutrient habitat thereof a sufficient amount of the following compound to prevent pupation:

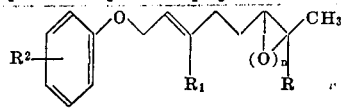

in which R and $R_1$ are independently methyl or ethyl; $n$ is an integer 0 or 1; $R_2$ is hydrogen, lower alkyl, lower alkynyl, lower alkoxy, halogen, nitro, lower alkyl thio, or certain heterocyclic radicals, wherein the amount of compound added to the nutrient habitat can range between about 0.0001 and 0.01 percent by weight of the nutrient habitat.

2. The method as set forth in claim 1 wherein R is methyl, $R_1$ is methyl and $R_2$ is ethyl and $n$ is 1.

* * * * *